Patented Oct. 5, 1954

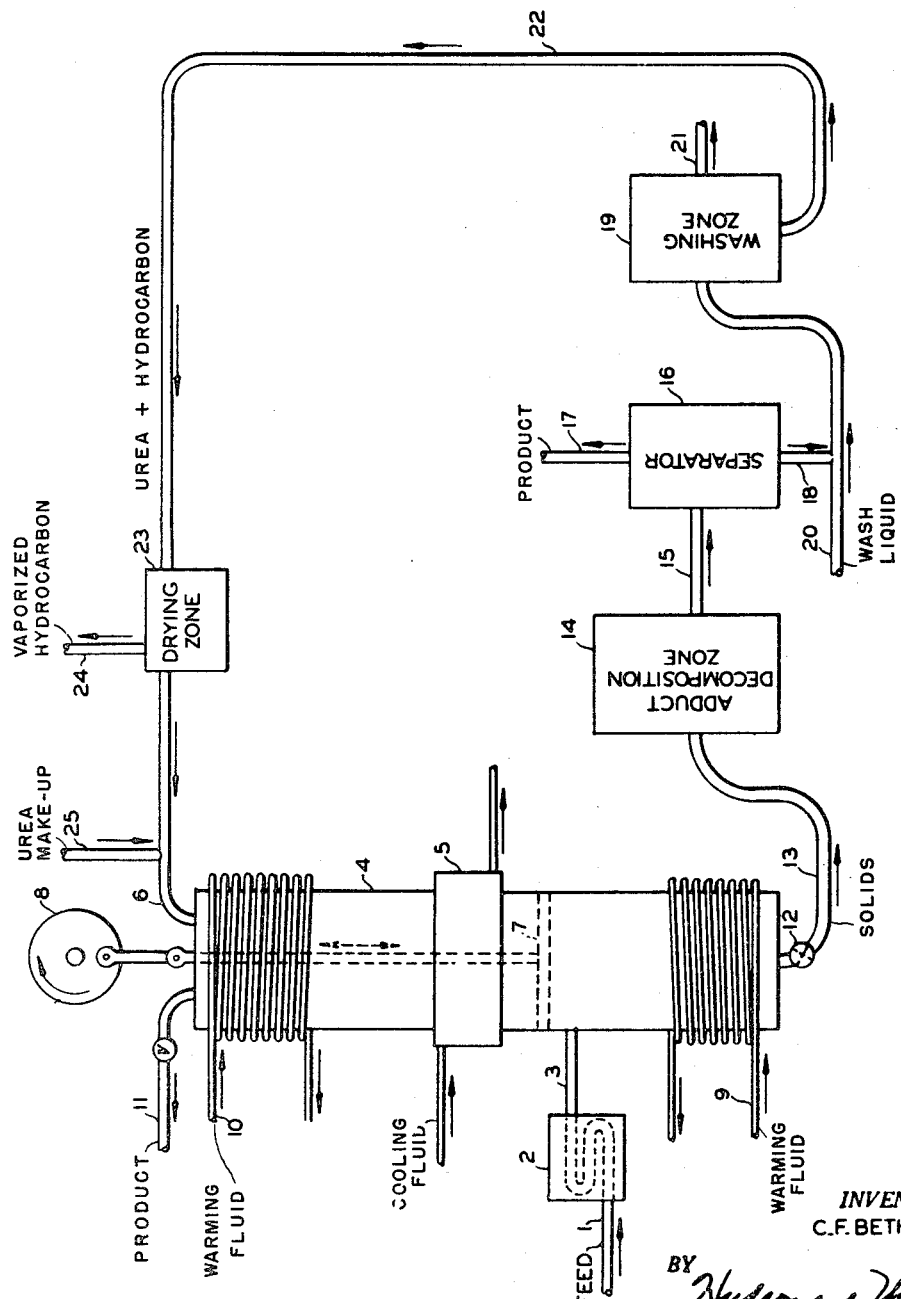

2,691,009

UNITED STATES PATENT OFFICE 2,691,009

SEPARATION PROCESS

Charles F. Bethea, Bartlesville, Okla., assignor to Phillips Petroleum Company, a corporation of Delaware Application July 31, 1950, Serial No. 176,804

5 Claims. (Cl. 260—96.5)

This invention relates to a process for separating mixtures of organic compounds. In one aspect this invention relates to a process for separating eutectic-forming mixtures of organic compounds.

In separating mixtures of organic compounds by crystallization, when each of the components becomes completely saturated with respect to the other component of the mixture, further abstraction of heat causes crystallization of both components of the mixture as a heterogeneous mass and in a definite ratio of concentrations. This is commonly referred to as a eutectic mixture. The temperature at which the heterogeneous mass crystallizes as a solid is a definite and fixed temperature at a given pressure, and this temperature is called the eutectic temperature. In eutectic mixtures the components are completely miscible when in the liquid state and completely immiscible when in the solid state. In contrast, in a solid solution-forming mixture, the components are at least partially miscible with each other in the solid state. In referring herein to mixtures having a eutectic composition, it will be understood that mixtures of near eutectic composition are included. As a practical matter, it is hardly likely that a mixture of the exact eutectic compositon would be obtained in a large scale crystallization operation. However, for my purpose when as much as practical of the saturating component has been crystallized without danger of crystallization of any eutectic mixture, the remaining mixture is referred to as having the eutectic composition.

If one of the components of a eutectic-forming mixture is present in excess of the concentration defined by the eutectic composition, that component is the saturating component and the other is the saturated component. When a eutectic-forming liquid mixture in which one of the components is present in excess of that defined by the eutectic mixture is cooled, the mixture becomes saturated first with the saturating component and the amount of the saturating component in excess of that defined by the eutectic composition can be crystallized as a solid and removed in that form from the mixture to leave a resulting liquid mixture having the eutectic composition. No further separation of the components in the mixture is possible by ordinary crystallization methods. The prior art discloses processes for separating a few specific mixtures by the addition of a third component to a binary eutectic mixture to produce a ternary mixture in which one of the original two components is present in excess of the ternary eutectic composition.

It is an object of this invention to provide a novel method for separating mixtures of organic compounds.

It is another object of this invention to provide a novel method for resolving eutectic-forming mixtures of organic compounds.

It is a further object of this invention to provide a novel method for resolving eutectic mixtures of organic compounds.

It is still a further object of this invention to provide a novel method for resolving eutectic mixtures of hydrocarbons wherein one of said hydrocarbons forms an addition product with an amide selected from the group consisting of urea and thiourea.

Further and additional objects of my invention will be readily apparent from the disclosure and description of my invention hereinbelow.

I have found that mixtures of organic compounds that form eutectic mixtures can be resolved in a novel manner that involves removal of one of said compounds from the eutectic mixture by reaction with an amide selected from the group consisting of urea and thiourea to form an addition product therewith. It is essential to the operation of my process that the saturating component of the mixture to be resolved be capable of reacting with one of the amides named above to form an addition product in order that crystalline saturating component and solid addition product of the amide and the saturating component can be separated from the mixture to be resolved. In order that crystals of the saturated component of the mixture are not removed therefrom with crystals of the saturating component and its adduct with one of the above-named amides, the saturating component should be the higher melting or freezing component of the mixture to be resolved. For greater ease in describing and understanding my invention, I will refer hereinafter to the saturating component of the mixture to be resolved as component A and to the saturated component of the mixture as component B.

The organic compounds that form adducts with urea and which may be component A in the mixture to be resolved in accordance with my invention are many and varied, and to determine whether any particular organic compound will or will not form an adduct with urea, it is merely necessary to admix such compound and urea with agitation and determine whether any crystalline product or adduct has formed. Obviously, such a determination is a matter of mere routine test, and it is well within the skill of the art. However, it has been found that, in general, a straight chain organic compound having a straight aliphatic carbon atom chain containing from 5 to 50, preferably at least 7, carbon atoms therein will form adducts with urea in preference to branched chain or cyclic organic compounds. The straight chain organic compounds can be unsubstituted hydrocarbons as well as hydrocarbons containing substituent groups, which will be discussed hereinbelow, attached to one of the two end carbon atoms of the carbon chain. Thus, straight chain paraffinic hydrocarbons containing from 5 to 50 carbon atoms, for example, pentane, hexane, heptane, octane, decane, dodecane, tetradecane, hexadecane, and progressively higher molecular weight straight chain paraffins form addition products or adducts with urea. Similarly, the corresponding monoolefinic and diolefinic hydrocarbons form adducts with urea provided the hydrocarbons contain an unbranched chain of from 5 to 50 carbon atoms. Additionally, derivatives of these saturated and unsaturated hydrocarbons form adducts with urea. For example, the hydroxy, the amino, the mercaptan, the sulfide, the disulfide and the halide derivatives of these hydrocarbons form adducts with urea. Also, various ketones and ester derivatives of these hydrocarbons react similarly. In accordance with my invention any eutectic-forming mixture containing one of the above described compounds as the saturating component thereof or component A and an organic compound that does not form an adduct with urea can be resolved.

On the other hand, organic compounds containing a branched chain of carbon atoms form adducts with thiourea and the characteristic feature of these compounds is the branched chain of carbon atoms. These compounds may also be component A of a eutectic-forming mixture to be resolved in accordance with my invention. Thus, with thiourea branched chain hydrocarbons containing from 3 to 50 carbon atoms in the straight carbon atom chain portion of the molecule and also having one or more alkyl substituents therein ranging from 1 to 20 carbon atoms in length will form addition products. Typical hydrocarbons are isobutane, isopentane, the methyl and ethyl pentanes, the methyl and ethyl hexanes, propylhexane and other higher molecule weight isoparaffins as well as the corresponding monoolefinic and diolefinic hydrocarbons. Also, these branched chain compounds may have attached either to the straight carbon chain or a branched carbon chain, substituent groups as set forth above in a discussion of compounds that form adducts with urea. Furthermore, various alicyclic type organic compounds form adducts with thiourea. For example, such compounds as cyclohexane, cyclohexene, menthane, and certain oxygenated derivatives of terpenes, for example, camphor, borneol, and fenchone form adducts with thiourea. In accordance with my invention any eutectic-forming mixture containing one of the above named compounds that form adducts with thiourea, and an organic compound that does not form an adduct with thiourea, can be resolved in the manner to be discussed in detail hereinbelow.

In practicing my invention the mixture to be resolved is cooled to about the eutectic temperature without effecting solidification of a eutectic mixture. As a result of this cooling a portion of component A is crystallized, and the remaining liquid contains component A and component B in a eutectic composition. The resulting mixture is then heated to a temperature above the freezing point of component B but not above the freezing point of component A. However, if solid component A is first removed from the accompanying eutectic mixture the temperature of that mixture can be raised above the freezing point of component A. Amide is then added to the resulting mixture to react with component A in the eutectic mixture and to form a solid adduct therewith. Consequently, component A of the starting mixture is now in the form of either crystals of component A or solid adduct with the amide. Component B remains in the liquid phase, and as such it is readily separable from the solids by any suitable means, for example, filtration, decantation, centrifuging and the like. Subsequently, the separated solids are heated to at least the melting point of component A to produce a mixture of liquid component A and solid adduct of urea and component A. If desired, only part of the solid component A crystals need be melted, and the mixture will then also contain solid component A. To decompose the adduct the mixture is heated above the decomposition temperature of the adduct, and the resulting mixture contains liquid component A and solid urea which are readily separable from each other. As a result of the use of my invention a eutectic-forming mixture is completely resolved in an efficient and expeditious manner.

I will describe my invention in further detail with reference to the accompanying drawing which is a schematic diagram of one method of employing my invention to resolve a eutectic-forming mixture of organic compounds. In referring to this drawing, I will employ a mixture containing equal molar portions of n-hexadecane and 3,3'-ditolyl, and consequently, this description will also serve as a specific example of my invention. The accompanying drawing does not include conventional equipment such as pumps, compressors, flow and temperature control devices, and the like, but the inclusion of such equipment is believed to be within the scope of my invention.

As indicated above, the feed mixture contains equal volumes of n-hexadecane and 3,3'-ditolyl. This mixture of hydrocarbons forms a eutectic mixture at about —4° C. and containing 83 mol per cent 3,3'-ditolyl and 17 per cent n-hexadecane. The freezing point of 3,3'-ditolyl is 7° C. and the freezing point of n-hexadecane is 18° C. Also n-hexadecane reacts with urea to form a solid addition product, but 3,3'-ditolyl is non-reactive with urea.

Referring now to the accompanying drawing, the feed mixture enters the system via line 1 and it is passed to cooler 2 where the temperature of the mixture is reduced to a temperature approaching the eutectic temperature of the mixture, say —3 to 15° C. As a result of this cooling, a portion of the n-hexadecane in the mixture is crystallized and the resulting mixture of liquid and solid is passed via line 3 to column 4. A portion of column 4 is encircled by jacket 5 through which a suitable cooling liquid, such as a liquid hydrocarbon, is passed, and in this manner, the jacketed portion of column 5 is maintained at the eutectic temperature of the feed mixture, which in this instance, is —4° C. Consequently, n-hexadecane solidifies in column 4, and the remaining liquid is composed of n-hexadecane and 3,3'-ditolyl in a eutectic composition. Solid urea is introduced to column 4 via line 6 and it contacts the eutectic liquid in the column. n-Hexadecane in the eutectic mixture reacts with the urea to form solid addition products which pass downwardly through the column with the solidified n-hexadecane.

Column 4 is provided with a reciprocating piston 7 which squeezes the solids in column 4 toward the bottom of the column and thus the separation of solids from liquids is improved. Piston 7 is shown schematically on the drawing and it may be of any suitable design, but it is essential that the piston be porous to permit the upward flow of liquids in the column during the downward stroke of the piston. For example, when the urea is introduced to the column above the piston, as shown on the drawing, it is essential that the piston be equipped with check valve provisions to permit the downward flow of solid through the piston on its upward stroke. A piston of this type is described in the copending application of Weedman filed October 23, 1950, Serial No. 191,676. On the other hand, it may sometimes be desirable to introduce the solid urea to column 4 at a point below the uppermost position of the piston. In that event, the urea is introduced intermittently only when the piston is in its uppermost position, and it is unnecessary that the piston be provided with means for permitting the downward flow of solids during the upward stroke of the piston. In any case, the piston employed must be screened or otherwise made porous to permit the upward flow of liquid during its downward stroke. By the use of such a piston, it is possible to squeeze the solids in column 4 toward the bottom of the column and to permit the upward flow of liquids in the column. Piston 7 is suitably connected to driving mechanism 8 which in turn is connected to a source of power not shown.

In column 4, crystals of n-hexadecane and solid adducts of urea and n-hexadecane pass toward the bottom of the column. The bottom of column 4 is provided with coils 9 through which a liquid, such as a liquid hydrocarbon, is passed to provide heat exchange. All or a portion of the n-hexadecane can be melted in the bottom of the column and part of the resulting liquid serves as a reflux wash liquid to remove liquid eutectic mixture from the solid hydrocarbon and adduct. The upper portion of column 4 is provided with a heat exchange device, such as heating or cooling coils 10 through which a suitable liquid, such as water or liquid hydrocarbon, is passed at room temperature. It is essential that the temperature in the upper portion of column 4 be above the freezing point of 3,3'-ditolyl in order that that hydrocarbon can be removed from the column via line 11 in the form of a liquid. Since room temperature is about the optimum temperature for forming urea adducts, the upper portion of the column is maintained at that temperature, say 60 to 80° F., although temperatures from just above the freezing point of 3,3'-ditolyl to 150° F. can be used. Consequently, the urea entering the top of the column reacts with n-hexadecane in the liquid eutectic mixture, and the resulting solid adduct and urea are passed downwardly through the column.

Solids containing crystalline n-hexadecane and adducts of n-hexadecane and urea are withdrawn from the bottom of column 4 via star valve 12 and line 13, and thus passed to adduct decomposition zone 14. Also, if more than the amount of urea required to react with the n-hexadecane has been introduced to the top of column 4, solid urea will also be withdrawn via line 13. Any liquid n-hexadecane in excess of that refluxed in the column is also withdrawn via line 13. In zone 14 the solid n-hexadecane is melted, and the resulting mixture of liquid n-hexadecane and solid adduct are heated to a temperature above the decomposition temperature of the adduct. Consequently, the adducts decompose to regenerate solid urea and liquid n-hexadecane. This mixture is passed via line 15 to separator 16 where the solid urea is separated from the liquid n-hexadecane in any suitable manner, such as by filtration, settling, and the like. Liquid n-hexadecane is withdrawn from the system via line 17. Since the urea separated in separator 16 contains substantial amounts of n-hexadecane, it is passed via line 18 to washing zone 19 where it is contacted with a hydrocarbon, such as n-pentane and the like entering the system via line 20. It will be understood that separator 16 and zone 19 are operated at a temperature above the decomposition temperature of the adduct of urea and n-hexadecane in order that the adduct that is decomposed in zone 14 is not reformed. From washing zone 19, liquid containing pentane and n-hexadecane is withdrawn via line 21 and this liquid is treated in any suitable manner, for example, flashing or fractional distillation to separate the n-pentane and the n-hexadecane therein. Solid urea containing sufficient n-pentane to permit pumping thereof is withdrawn from zone 19 and passed via line 22 to drying zone 23 where it is heated to drive off the n-pentane. That hydrocarbon is withdrawn from zone 23 via line 24, and, if desired, it can be condensed and returned to zone 19 for further use. Dried solid urea from zone 23 is then returned to column 4 via line 6 by means of an auger or other suitable device, and any additional urea required for the operation of the process is introduced to the system via line 25. If desired, the dried urea from zone 23 may be cooled prior to its return to column 4.

In the process described above I have not employed an amide solvent in the adduct-forming reaction, but it is within the scope of my invention to employ a solvent. Suitable solvents are water and oxygenated hydrocarbon derivatives, for example, methanol, ethanol, acetone, methyl ethyl ketone, propanol, secondary butyl alcohol, and the like. Other solvents are nitrogen-containing compounds that do not form adducts with the amide. A large number of nitrogen-containing compounds that are useful for this purpose are described in the co-pending application of Ackerman, Serial No. 155,134, filed April 10, 1950. The amount of solvent employed varies over wide limits. For example, only sufficient solvent may be used to wet the amide without forming a separate, filterable liquid phase, and usually about 10 weight per cent solvent is suitable. On the other hand, sufficient solvent to form a saturated or unsaturated solution of amide in solvent may be used.

Although I have described my invention by separating a mixture of n-hexadecane and 3,3'-ditolyl, it will be obvious to those skilled in the art that my invention can be applied to the resolution of any of the eutectic-forming mixtures discussed above. Other specific mixtures that can be resolved in this manner are n-hexadecane and p-benzyl toluene, and n-hexadecane and dimethyl naphthalene. It will also be apparent to those skilled in the art that numerous modifications of the process disclosed hereinabove are possible without departing from the scope and spirit of my invention.

I claim:

1. A method of resolving a mixture of hydrocarbons which form a eutectic mixture, one of said hydrocarbons being capable of reacting to form a solid complex with urea and one of said hydrocarbons being non-reactive with urea, said mixture containing said hydrocarbon reactive with urea in a proportion greater than the proportion of said hydrocarbon in said eutectic mixture, and said reactive hydrocarbon being the higher freezing hydrocarbon in said mixture, which comprises introducing said mixture to a reaction zone at a point intermediate the extremities thereof; reducing the temperature of said mixture to its eutectic temperature in a zone intermediate the extremities of said reaction zone to effect solidification of reactant hydrocarbon and formation of a liquid eutectic mixture of reactant and non-reactant hydrocarbons; passing solid material to one end of said reaction zone and liquid material to the other end thereof; maintaining said last-mentioned end of said reaction zone at a temperature above the melting point of said non-reactive hydrocarbon and in an adduct forming temperature range; introducing urea to said last-mentioned end to produce a solid adduct between liquid reactant hydrocarbon and urea; melting a portion of solid reactive hydrocarbon in said first-mentioned end, resulting liquid hydrocarbon acting as reflux and washing medium for said solid adduct; withdrawing from said last-mentioned end liquid non-reactive hydrocarbon substantially free of reactive hydrocarbon; withdrawing from said first-mentioned end solidified reactive hydrocarbon in admixture with said solid adduct; and separately recovering from said mixture said urea and said reactive hydrocarbon.

2. A method of resolving a mixture of 3,3'-ditolyl and n-hexadecane, said compounds forming a eutectic mixture, said n-hexadecane being capable of reacting to form a solid complex with urea and said 3,3'-ditolyl being non-reactive with urea, said mixture containing said n-hexadecane in a proportion greater than the proportion of said n-hexadecane in said eutectic mixture, and said n-hexadecane being the higher freezing hydrocarbon in said mixture, which comprises introducing said mixture to a reaction zone at a point intermediate the extremities thereof; reducing the temperature of said mixture to its eutectic temperature in a zone intermediate the extremities of said reaction zone to effect solidification of n-hexadecane and formation of a liquid eutectic mixture of n-hexadecane and 3,3'-ditolyl; passing solid material to one end of said reaction zone and liquid material to the other end thereof; maintaining said last-mentioned end of said reaction zone above the melting point of said 3,3'-ditolyl and in an adduct forming temperature range; introducing urea to said last-mentioned end to produce a solid adduct between liquid n-hexadecane and urea; melting a portion of solid n-hexadecane in said first-mentioned end, said liquid n-hexadecane acting as reflux and washing medium for said solid adduct; withdrawing from said last-mentioned end liquid 3,3'-ditolyl substantially free of n-hexadecane; withdrawing from said first-mentioned end solidified n-hexadecane in admixture with said solid adduct; and separately recovering from said mixture said urea and said n-hexadecane.

3. A method of resolving a mixture of hydrocarbons which form a eutectic mixture, one of said hydrocarbons being capable of reacting to form a solid adduct with an amide selected from the group consisting of urea and thiourea, and one of said hydrocarbons being non-reactive with the selected amide, said mixture containing said hydrocarbon reactive with said amide in a proportion greater than the proportion of said hydrocarbon in said eutectic mixture, and said reactive hydrocarbon being the higher freezing hydrocarbon in said mixture, which comprises introducing said mixture to a reaction zone at a point intermediate the extremities thereof; reducing the temperature of said reaction zone to effect solidification of reactive hydrocarbon and formation of a liquid eutectic mixture of reactive and non-reactive hydrocarbons; passing solid material to one end of said reaction zone and liquid material to the other end thereof; maintaining said last-mentioned end of said reaction zone at a temperature above the melting point of said non-reactive hydrocarbon and in an adduct forming temperature range; introducing the selected amide to said last-mentioned end to produce a solid adduct between liquid reactant hydrocarbon and said selected amide; melting a portion of solid reactant hydrocarbon in said first-mentioned end, resulting liquid hydrocarbon acting as reflux and washing medium for said solid adduct; withdrawing from said last-mentioned end liquid non-reactive hydrocarbon substantially free of reactive hydrocarbon; withdrawing from said first-mentioned end solidified reactive hydrocarbon in admixture with said solid adduct and separately recovering from said mixture said selected amide and said reactive hydrocarbon.

4. A method according to claim 3 in which the selected amide is urea.

5. A method according to claim 3 in which the selected amide is thiourea.

References Cited in the file of this patent

UNITED STATES PATENTS

| Number | Name | Date |
|---|---|---|
| 2,470,116 | Swietoslawski | May 17, 1949 |
| 2,520,715 | Fetterly | Aug. 29, 1950 |
| 2,549,372 | Fetterly | Apr. 17, 1951 |

OTHER REFERENCES

Australian patent application 17,339-47 (available, November 2, 1948).